United States Patent [19]

Gouvenot

[11] Patent Number: 4,514,228

[45] Date of Patent: Apr. 30, 1985

[54] COMPOSITION FOR MAKING IMPERMEABLE WALLS AND OTHER UNDERGROUND STRUCTURES

[75] Inventor: Daniel Gouvenot, Nanterre, France

[73] Assignee: Soletanche, Nanterre, France

[21] Appl. No.: 512,207

[22] Filed: Jul. 8, 1983

Related U.S. Application Data

[63] Continuation-in-part of Ser. No. 350,298, Feb. 19, 1982, abandoned.

[30] Foreign Application Priority Data

Feb. 20, 1981 [FR] France ............................. 81 03410

[51] Int. Cl.³ .................................................. C04B 7/35
[52] U.S. Cl. ........................................................ 106/98
[58] Field of Search ............................................ 106/98

[56] References Cited

U.S. PATENT DOCUMENTS

| | | | |
|---|---|---|---|
| 2,410,954 | 11/1946 | Sharp | 106/98 |
| 2,805,719 | 9/1957 | Anderson | 106/98 |
| 3,118,779 | 1/1964 | Leonard | 106/98 |
| 3,558,335 | 1/1971 | Messenger | 106/98 |

OTHER PUBLICATIONS

Lea & Desch, The Chemistry of Cement and Concrete, Edward Arnold (Pub.) Inc., London, 1956, pp. 252–253.

*Primary Examiner*—James Poer
*Attorney, Agent, or Firm*—Robert Scobey

[57] ABSTRACT

A composition for making impermeable walls and other underground structures comprising water, a cement, a silica compound in a dispersed form, and an activating agent selected from the group consisting of an alkaline base and an alkaline salt of a weak acid which do not contain silica, the ratio by weight of lime to silica being less than 1 and preferably between approximately 0.3 to 0.5.

8 Claims, No Drawings

COMPOSITION FOR MAKING IMPERMEABLE WALLS AND OTHER UNDERGROUND STRUCTURES

This application is a continuation-in-part of application Ser. No. 350,298, filed Feb. 19, 1982, now abandoned.

The use of compositions based on cement in constructing walls buried in the ground is known, with the composition both preserving the ground while a trench of a shape corresponding to that of the wall is being excavated and, upon hardening, forming the actual wall.

The use of such compositions is also known in the field of soil injection for the purpose of consolidation or tightness as well as to seal anchor rods.

Compositions of this type consist of a mixture of water and cement, possibly in the presence of a thixotropic colloid like bentonite, which provides the mixture with stability when the proportion of cement is relatively low, grout requiring a certain amount of cement to set.

The amount of thixotropic colloid depends on its nature. Thus, if bentonite is employed with a small amount of cement (30–100 kg of cement per $m^3$ for example), the composition will generally contain from 15 to 100 kg and preferably from 20 to 60 kg of bentonite per $m^3$ of water in accordance with the nature of the bentonite.

When clays are used instead of bentonite as thixotropic colloids in such compositions, they are present in a ratio of approximately 100 to 600 kg per $m^3$ of water.

In the case of organic colloids, 1 to 10 kg of colloid per $m^3$ of water is usually sufficient.

The compositions that are used at state of the art to obtain impermeable walls in accordance with the aforesaid technique have a cement-to-water ratio that, although it can be relatively low, is higher than 0.08, meaning that the compositions will contain more than 80 kg of cement per $m^3$ of water.

The addition of a disperse form of silica to compositions of this type in order to improve the resistance of the resulting product is also known. This silica may derive from different products that are less expensive than cement, like fly ash, puzzolans, or kieselguhr. Improvement of the characteristics of the resulting structure, which is limited by state of the art, results from the reaction of some of this silica with the lime that is released by the cement during hydration.

The present invention is based on the surprising discovery that if compositions of the aforesaid type are employed that are also characterized by having a ratio by weight of lime to silica that is less that 1 and preferably between 0.3 and 0.5 and by containing an activating agent capable of solubilizing the silica and consisting of an alkaline base or an alkaline salt of a weak mineral acid containing no silicon, a substantial improvement in the properties (especially impermeability and mechanical resistance) of the resulting structures will be obtained. The present invention accordingly now makes it possible to either significantly reduce the proportion of cement in the composition or to significantly improve the properties of a structure containing a given proportion of cement. Stated another way, a key aspect of the invention is in the use of an activating agent not for the purpose of accelerating the set, as activating agents are known for use, but rather for increasing the properties of the final, set product.

Improvement in the resistance of the structures in accordance with the invention develops only gradually and is not definitely complete before 90 days or longer.

The activating agents employed in accordance with the invention must not be confused with cement-setting accelerators, as noted above which make the composition harden more rapidly but have no effect on long-term mechanical properties. Chlorides and calcium or sodium silicates are usually employed as accelerators.

The invention makes it possible to erect structures more inexpensively because it is more economical to add a siliceous material and an activating agent to the cement than to build a larger structure or increase the amount of cement.

The invention that is the object of the present patent also allows a significant decrease in the amount of cement that must be introduced into the composition.

The invention also allows the the amount of cement employed in such applications to be decreased by approximately one half or two thirds at equivalent structural properties.

The object of the present invention is a composition based on water, cement, and silica, intended for the construction of underground structures, in which the ratio of weight of lime (CaO), in relation to the silica ($SiO_2$) that is, is less than 1 and preferably between 0.3 and 0.5, and that also contains an activating agent consisting of an alkaline base or an alkaline salt of a weak acid containing no silicon.

In accordance with the invention, it is practical for the activating agent to consist of caustic soda, caustic potash, sodium carbonate, potassium carbonate, sodium bicarbonate, or potassium bicarbonate.

The silica that is introduced into the composition is preferably, in accordance with the invention, in a dispersed form, meaning that it has an extensive surface area per unit of weight (a specific surface of more than 2500 $cm^2/g$).

It is possible in accordance with the invention to add the silica in a compound that also contains for example kieselguhr, fly ash, puzzolan, or silica fume (a by-product of ferrosilicon manufacture).

The compound generally contains in accordance with the invention between 50 and 2500 kg of cement per $m^3$ of water and between 50 and 400 kg of finely divided siliceous product per $m^3$ of water. The composition also contains about 1 to 6% and preferably from 2 to 4% by weight of activating agent in relation to the weight of the siliceous product.

When the composition in accordance with the invention contains small amounts of cement it is practical to introduce up to about 60 kg per $m^3$ of a colloidal agent like bentonite to provide it with sufficient consistency. The compositions in accordance with the invention allow the construction of impermeable buried walls with a concentration of slag cement that is only about 30 kg per $m^3$, whereas by conventional techniques it is necessary to employ at least 80 kg of the same kind of cement per $m^3$ of water.

The present invention also allows the production of compositions that contain only 50 to 60 kg of portland cement per $m^3$ of water, whereas by presently known conventional techniques it is necessary to employ from 150 to 180 kg of this cement per $m^3$ of water.

Naturally, however, the invention is in no way limited to compositions containing minimal levels of cement and the amount of cement will be essentially determined as a function of the mechanical resistance that it is desired to provide to a particular part of the structure being produced.

It is accordingly possible to produce structures with very powerful resistance due to compositions obtained by adding to a concentrated mixture of water and cement (at least 2000 kg of cement for 1000 liters of water) a siliceous material that is very rich in silica and extremely fine, like silica fume, and an activating agent that will make it possible to obtain not only extremely increased ultimate resistance but also initial resistances that are higher than those (about 100 kg/cm$^2$ after 24 hours) than can be obtained with conventional compositions. This particular type of composition is especially interesting because of the sealing of anchor rods, which must be ready to resist tension very rapidly (two days after emplacement for example).

In addition to obtaining for example an impermeable wall or a grout with given characteristics, the addition in accordance with the invention of an activating agent to a composition with a line-to-silica ratio of less than 1 allows an amount of cement of be employed that is at least about half what is needed in the technique presently employed.

It is interesting to note that the cement-based composition in accordance with the invention is activated by products, like soda and sodium carbonate, the use of which is formally discouraged at the present level of information in state of the art (because of the formation of expansive salts that alter the quantity of the concrete).

Several embodiments of the invention will now be described by way of illustration only and without limiting its scope in any way with reference to the following examples.

EXAMPLE 1

A composition in accordance with the invention and consisting of a mixture of 50 kg of CLK cement (containing at least 80% slag cement), 35 kg of bentonite obtained from the firm Société Francaise des Bentonites et Dérivés and sold under reference CV15, and 50 kg of fly ash obtained from a heating plant in 1 m$^3$ of water is employed to construct an impermeable wall in the ground.

An activating agent consisting of 2.25 kg of caustic soda (NaOH) is added to the fly ash.

In one variation, 3 kg of sodium carbonate can be employed as an activating agent.

At the moment of employment the ratio by weight of lime to silica is about 0.4.

After 28 days the resistance of the grout is between 2 and 3 bars.

EXAMPLE 2

A composition in accordance with the invention is obtained by mixing 50 kg of CLK cement (cement containing at least 80% slag cement), 45 kg of bentonite obtained from the firm Société Carbonisation et Charbons Actifs under reference FTP2, 50 kg of kieselguhr, and 1 kg of caustic soda or 1.5 kg of sodium carbonate with 1 m$^3$ of water.

At the moment of employment the ratio by weight of lime to silica in the grout is about 0.37.

After 28 days the resistance of the grout is between 3 and 4 bars.

EXAMPLE 3

A composition in accordance with the invention is obtained by adding 100 kg of portland cement, 60 kg of bentonite obtained from the firm Société Francaise des Bentonites et Dérivés and sold under reference C Forages, 150 kg of fly ash, finely milled as indicated in the foregoing, and 7 kg of potassium carbonate as an activator to 1 m$^3$ of water.

After 28 days the resistance is between 2 and 3 bars.

At the moment of employment the ratio by weight of lime to silica is perceptible equal to 1.

EXAMPLE 4

A composition in accordance with the invention is obtained by adding 150 kg of portland cement, 35 kg of bentonite obtained from the firm Société Carbonisation et Charbons Actifs under reference FTP2 and having one of the provenances indicated in the foregoing, 50 kg of kieselguhr, and 1 kg of caustic soda or 1.5 kg of sodium carbonate to 1 m$^3$ of water.

At the moment of employment the ratio by weight of lime to silica is approximately 1.

After 28 days the resistance is between 3 and 4 bars.

The following remarks apply to the four examples that have just been described.

First, if silica and activating agent are not introduced into these mixtures, the composition will not set at all.

In other words, compositions consisting of 1 m$^3$ of water and 35 kg of CLK cement (with at least 80% slag cement) or 100 kg of portland cement will not set.

For purposes of comparison, to obtain a composition that has a resistance of 2 to 3 bars after 28 days it is necessary to use 100 kg of CLK cement and 35 kg of CV15 or FTP2 bentonite per m$^3$ of water, whereas in accordance with the invention the amount of cement can be reduced by half (Example 2) by the addition of 50 kg of kieselguhr and 1 kg of soda.

To obtain a composition that will have a resistance in the vicinity of only 2 after 28 days, it is necessary to employ 300 kg of portland cement and 35 kg of bentonite per m$^3$ of water, whereas according to Examples 3 and 4 it is possible to reduce the amount of cement to 100 or 150 kg.

EXAMPLE 5

A composition than can be employed to construct either a prefabricated wall or sewers is obtained by adding 100 kg of CLK 45 cement (containing at least 80% slag cement), 35 kg of CV15 or FTP2 bentonite, 100 kg of kieselguhr, and either 2 kg of caustic soda or 3 kg of sodium carbonate to 1 m$^3$ of water.

At the moment of employment the ratio by weight of lime to silica is 0.4.

After 28 days the resistance is about 12 bars.

EXAMPLE 6

A composition that can be employed for the same purposes as those in Example 5 is obtained by adding 200 kg of portland cement, 25 kg of CV15 or FTP2 bentonite, and 300 kg of fly ash activated with 15 kg of potassium carbonate to 1 m$^3$ of water.

At the moment of employment the ratio by weight of lime to silica is 0.6.

After 28 days the resistance of the grout is about 20 bars.

EXAMPLE 7

A composition in accordance with the invention is obtained by adding 500 kg of CPJ45 cement (containing 70% clinker and 30% fly ash), 200 kg of silica fume, and 4 kg of caustic potash to 1 m$^3$ of water.

After 28 days the resistance of the grout is between 80 and 100 bars.

At the moment of employment the ratio by weight of lime to silica is in the vicinity of 0.7.

EXAMPLE 8

A composition in accordance with the invention is obtained by adding 5 kg of type-FTP2 bentonite, 1000 kg of CPJ45 cement (containing 70% clinker and 30% fly ash), 200 kg of silica fume, and 4 kg of caustic soda to 1 m$^3$ of water.

After 28 days the resistance of the grout is between 230 and 280 bars.

At the moment of employment the ratio by weight of lime to silica is close to 0.9.

EXAMPLE 9

A composition in accordance with the invention is obtained by adding 1500 kg of CPJ45 cement (containing 70% clinker and 30% fly ash), 225 kg of silica fume, and 4 kg of caustic soda, to 1 m$^3$ of water.

After 28 days the resistance of the grout is between 450 and 500 bars.

At the moment of employment the ratio by weight of lime to silica is in the vicinity of 1.

EXAMPLE 10

A composition in accordance with the invention is obtained by adding 2000 kg of CLC45 cement (containing 50% clinker, 25% slag, and 25% fly ash), 400 kg of silica fume, 5 kg of caustic potash, and 30 liters of superfluidifier obtained from the firm Compagnie Francaise des Produits Industriels and sold under reference LH 1140 or LH 4435 to 1 m$^3$ of water.

After 28 days the resistance of the grout is between 550 and 600 bars.

At the moment of employment the ratio by weight of lime to silica is 0.89.

EXAMPLE 11

A composition in accordance with the invention that can be employed to seal anchor rods before they are very rapidly tensioned is obtained by adding 2200 kg of CLC45 cement (containing 50% clinker, 25% slag, and 25% fly ash), 200 kg of silica fume, 12 kg of caustic soda, and 20 liters of LH 4435 superfluidifier sold by the firm Compagnie Francaise des Produits Industriels to 1 m$^3$ of water.

After 24 hours the resistance of the grout is between 60 and 100 bars and after 28 days on the order of 450 to 500 bars.

At the moment of employment the ratio by weight of lime to silica is in the vicinity of 1.

I claim:

1. Composition for making impermeable walls and other under-ground structures comprising water, a cement, a silica compound in a dispersed form and an activating agent selected from the group consisting essentially of an alkaline base and an alkaline salt of a weak acid which do not contain silica, the ratio by weight of lime to silica being less than 1 and preferably between approximately 0.3 to 0.5.

2. Composition according to claim 1 containing between 50 to 2500 kg of cement per cubic meter of water.

3. Composition according to claim 1 containing between 50 to 400 kg of silica compound per cubic meter of water.

4. Composition according to claim 1 containing between 1 to 6% of the activating agent relative to the weight of the silica compound.

5. Composition according to claim 4 containing between 2 to 4% of the activating agent relative to the weight of the silica compound.

6. Composition according to claim 1 containing up to 60 kg of a colloidal agent per cubic meter of water.

7. Composition according to claim 1 in which the activating agent is selected from the group consisting of soda, potash, sodium carbonate, potassium carbonate, sodium bicarbonate and potassium bicarbonate.

8. Composition according to claim 1 in which the silica compound is a siliceous material selected from the group consisting of kieselguhr, fly ash and silica fume.

* * * * *